US012683817B2

(12) United States Patent
Attico

(10) Patent No.: US 12,683,817 B2
(45) Date of Patent: Jul. 14, 2026

(54) BLOCKCHAIN RECORD CERTIFICATION

(71) Applicant: ServiceNow, Inc., Santa Clara, CA (US)

(72) Inventor: Nicola Attico, Milan (IT)

(73) Assignee: ServiceNow, Inc., Santa Clara, CA (US)

( * ) Notice: Subject to any disclaimer, the term of this patent is extended or adjusted under 35 U.S.C. 154(b) by 128 days.

(21) Appl. No.: 18/516,298

(22) Filed: Nov. 21, 2023

(65) Prior Publication Data

US 2025/0168023 A1 May 22, 2025

(51) Int. Cl.
*H04L 9/00* (2022.01)
*H04L 9/32* (2006.01)

(52) U.S. Cl.
CPC .............. *H04L 9/50* (2022.05); *H04L 9/3247* (2013.01)

(58) Field of Classification Search
CPC ................................ H04L 9/50; H04L 9/3247
See application file for complete search history.

(56) References Cited

U.S. PATENT DOCUMENTS 10,721,266 B1 * 7/2020 Herman-Saffar ... H04L 63/1441
2016/0209314 A1 * 7/2016 Nesland, Sr. ...... G01N 33/2888

2018/0294956 A1 * 10/2018 O'Brien .............. G06F 11/1464
2019/0229926 A1 * 7/2019 Handa ................... H04L 9/3239
2019/0370810 A1 12/2019 Hu
2020/0050797 A1 2/2020 Suh
2020/0382555 A1 * 12/2020 Courtney ............ H04L 63/0442
2021/0374675 A1 * 12/2021 George .................. G06F 11/30
2022/0012668 A1 * 1/2022 Kraus ................... H04L 9/3239
2023/0214832 A1 * 7/2023 Hu ....................... G06Q 20/401
705/75

FOREIGN PATENT DOCUMENTS

CN 111865988 10/2022

OTHER PUBLICATIONS

Waldman, Jonathan, "Blockchain Fundamentals," https://web.archive.org/web/20220901000000*/https://learn.microsoft.com/en-us/archive/msdn-magazine/2018/march/blockchain-blockchain-fundamentals. Indexed on Oct. 20, 2022. (Year: 2022).*

* cited by examiner

*Primary Examiner* — Jung W Kim
(74) *Attorney, Agent, or Firm* — McDonnell Boehnen Hulbert & Berghoff LLP

(57) ABSTRACT

An update request is initiated to update a record of a management system. In response to the request, the record is updated in a storage of the management system. In response to the request, a digest of the update request is generated and the digest is signed. The signed digest is recorded on a blockchain different from the storage of the management system.

19 Claims, 9 Drawing Sheets

801 Receive Audit Report Request

803 Retrieve Application Updates From Record Management System

805 Retrieve And Confirm Blockchain Record Certifications

807 Validate Application Updates With Blockchain Record Certifications

809 Generate And Provide Audit Report

BLOCKCHAIN RECORD CERTIFICATION

BACKGROUND OF THE INVENTION

Organizations often integrate with external organizations or entities to fulfill functional requirements. Example functional requirements include services such as information technology incident resolution, human resource management, and expense reporting services, among others. Often these integrations between parties are implemented by utilizing exposed third-party service protocols. For example, a third-party service provider can offer its software-as-a-service via defined interfaces such as web application programming interfaces (APIs).

BRIEF DESCRIPTION OF THE DRAWINGS

Various embodiments of the invention are disclosed in the following detailed description and the accompanying drawings.

DETAILED DESCRIPTION

Figure 1:
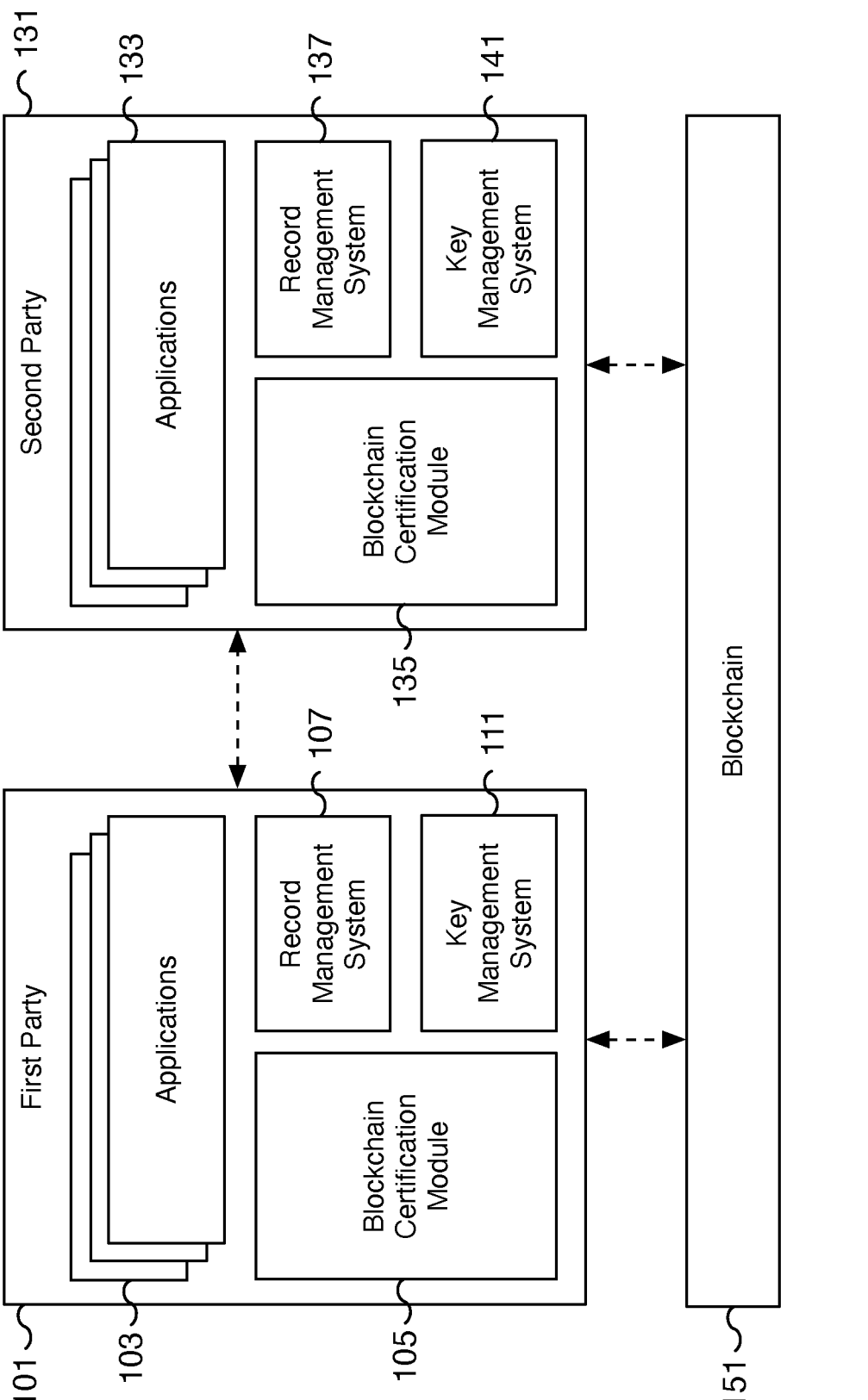
FIG. 1 is a block diagram illustrating an example of a network environment for performing blockchain record certification among two parties.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Blockchain record certification is disclosed. For example, using the disclosed techniques, application updates including record updates between two different parties can be certified using a record certification stored on a blockchain or similar ledger. The blockchain certification offers an immutable and irrefutable accounting of an application update. In various embodiments, when a first party receives a request to update an application, such as an incident report, that requires utilizing a second party service, the second party is notified of the update. In the disclosed embodiments, a certification of the application update, agreed to by both parties, is stored on a blockchain. In the event of an accounting of the update is required, such as to resolve a dispute related to a service level agreement, the blockchain certification can be used to audit application update results. In various embodiments, each party can utilize their own system of records to store their own version of the same application update. A digest of the application update, signed by both parties, is stored within the blockchain record certification. By storing only the digest of the application update, no confidential information is stored in a public or private blockchain. Since both parties have an opportunity to review the update before signing the record certification, the blockchain certification functions as and corresponds to an agreement from both parties that the update is accurate. In various embodiments, the blockchain record certification includes timing and/or party information, such as the time the application update was created and/or transmitted from one party to the other and/or the names and/or identities of each party. The included information can include other identifying information such as service agreement terms. In various embodiments, any included information stored on the blockchain is stored as a digest version and/or can be encrypted.

In some embodiments, the two parties to the blockchain certification correspond to different organizations and/or entities. For example, their corresponding information technology environments can operate on different functional networks such as using different network domains and/or behind different network firewalls. Access to services associated with each party can be exposed via third-party service protocols such as via web application programming interfaces (APIs). In some embodiments, one or more of the parties may be clients of a service provider and/or one party may be a service provider such as a cloud service provider and the second party may be a client (and/or customer) of the service provider. The disclosed techniques and systems for storing, retrieving, and verifying a blockchain record certification allow all parties involved to acknowledge their respective agreement to the update while also maintaining local copies of the update in their own respective record management systems. Although the disclosure techniques and systems are primarily described with respect to two parties, the techniques and systems can be extended to three or more parties. For example, each additional party can receive a reference to the blockchain certification and once authenticated by the recipient party, the recipient can update the blockchain certification by signing it, such as with its own cryptographic private key.

In some embodiments, an update request to update a record of a management system is initiated. For example, a submitted incident ticket is received by an incident management system. The submitted ticket corresponds to an application update for updating an incident record associated with a management system. In some embodiments, in response to the request, the record is caused to be updated in a storage of the management system. For example, the associated incident record is updated in the storage of the management system. This update can correspond to a local update of a local record since the record is associated with the recipient's own management system, which can be a private management system that is typically inaccessible to external parties. In some embodiments, in response to the request, a digest of the update request is generated and the digest is signed. For example, a digest such as a hash of the application update is generated and signed. The digital signature can utilize the party's private cryptographic key and may require access to the party's key management system. In some embodiments, the update includes information such as the timing associated with the update, the party name, expected external recipients of the update, and/or service agreement terms, among other information. In some embodiments, the signed digest is caused to be recorded on a blockchain different from the storage of the management system. For example, the signed digest is stored to a public blockchain as a blockchain record certification of the update. In some embodiments, the blockchain is a private blockchain associated with the involved parties. For example, each party to the update can run a node of the private blockchain. In some embodiments, the blockchain is a public ledger where data stored to the ledger is at least immutable.

In some embodiments, a notification associated with the update request is provided to a second management system. For example, a notification from the first party receiving the update request is made to inform a second party of an application update. The notification can be initiated via a web API or another network protocol. In particular embodiments, a notification corresponds to a request by the first party for the second party to process the application update. For example, an application update corresponding to an incident report may delegate resolving a portion of an incident submitted to the first party for the second party to resolve. The received application update by the second party can include a reference to the blockchain record certification of the update. In some embodiments, the blockchain record certification of the update can be accessed with a known address of the update or a reference to a starting point to find the blockchain record certification. In various embodiments, the second party validates the received application update, confirming the update with the digest version stored in the blockchain record certification. Once the application update is verified as accurate, the second party can sign the blockchain record certification. Moreover, the second party can store the application update in its own management system. In various embodiments, all parties involved in the application update can retrieve the updated blockchain record certification to confirm the contents of the application update (against their own record) and that the other respective parties have signed the certification. In some embodiments, the second party provides an acknowledgement to the first party that an update notification was received and/or that the blockchain record certification was updated with the second party's digital signature.

FIG. 1 is a block diagram illustrating an example of a network environment for performing blockchain record certification among two parties. In the example shown, two parties 101 and 131 exchange an application update that is certified on blockchain 151. In the example shown, each party includes corresponding components for implementing its role in the blockchain record certification. Party 101 includes applications 103, blockchain certification module 105, record management system 107, and key management system 111. Similarly, party 131 includes applications 133, blockchain certification module 135, record management system 137, and key management system 141. Parties 101 and 131 are each a network device such as a computing client and/or server and are communicatively connected to one another (as shown by the dashed arrow between the two parties). Similarly, parties 101 and 131 both have network access to blockchain 151 (as shown by the corresponding dashed arrows between each party and blockchain 151) in order to write and read blockchain transactions and/or data. In some embodiments, the corresponding network (not shown) for establishing the connectivity between party 101, party 131, and blockchain 151 is a public network such as the Internet. In various embodiments, parties 101 and 131 can correspond to computing devices on separate networks and they may be located physically remote from one another, such as on different secure networks, and/or parties 101 and 131 may correspond to different servers including one or more virtual private servers. Further, parties 101 and 131 can correspond to different management systems, for example, each with its own record management system 107 or 137, respectively, and key management systems 111 or 141, respectively. Using the disclosed techniques, parties 101 and 131 can agree on an update, such as an application update, that is certified using a blockchain record certification stored on blockchain 151. Moreover, the updates certified by the blockchain record certifications correspond to local records stored by each party in their own respective record management systems 107 and 137. Although the certification process and components are described in FIG. 1 with respect to two parties 101 and 131, in various embodiments, the process is also applicable with respect to two or more parties.

In some embodiments, first party 101 is a network computing device such as a network client and/or network server. For example, party 101 can be both a network client for accessing services hosted by party 131 and a server for offering services such as cloud-based services via applications 103. In various embodiments, applications 103 are hosted by party 101 and are accessible by network clients (not shown). Applications 103 can include software-as-a-service applications such as information technology incident resolution, human resource management, and expense reporting services, among others. When an update request is made for an application of applications 103 that requires blockchain certification, the update request is processed via blockchain certification module 105. For example, applications 103 can utilize application programming interfaces (APIs) of blockchain certification module 105 to update an application record on a local system of records such as record management system 107, certify the record via blockchain 151 using a blockchain certification record, initiate the notification of the update to an external service such as a service of party 131, and verify the notification was accepted by the external service.

In various embodiments, the blockchain certification record stored on blockchain 151 by party 101 utilizes a signed digest of the application update. The digest can be performed via blockchain certification module 105 and the digital signature of party 101 can be added utilizing cryptographic keys of key management system 111. In various embodiments, record management system 107 of party 101 is a local management system of party 101 for storing and updating records. In some embodiments, record management system 107 is implemented as a database, such as a local and/or distributed database. Applications 103 may interface directly with record management system 107 or via blockchain certification module 105. In various embodiments, notifications of application updates are transmitted from party 101 to party 131, for example, to utilize services of request party 131 to process the update. For example, an incident ticket can be assigned to a third party such as party 131 for resolution. In some embodiments, once a third party receives an application update, such as a service request via a web API, the external third party, such as party 131 in FIG. 1, will verify the application update corresponds to the appropriate blockchain certification. Once the blockchain record certification is verified, the receiving party signs the certification acknowledging the application update received is correct. In some embodiments, the receiving party then notifies the sending party, such as party 101, with an acknowledgement message to acknowledge receipt of the application update. In response to the acknowledgement, the blockchain certification record can be retrieved to confirm that all parties have added their corresponding digital signatures.

In some embodiments, second party 131 is also a network computing device such as a network client and/or network server. For example, party 131 can be both a network client for accessing external services (not shown) and a server for offering services such as cloud-based services via applications 133. In various embodiments, applications 133 are hosted by party 131 and are accessible by network clients such as party 101, for example, to service application requirements of applications 103 of party 101. Similar to applications 103, applications 133 can include software-as-a-service applications such as information technology incident resolution, human resource management, and expense reporting services, among others. When a network update request is initiated at party 101, a notification of the update request is transmitted from party 101 to party 131. In various embodiments, the recipient at party 131 of the update request notification is an application of applications 133. The update request notification may correspond to an incident report related to IT incident resolution, a modification to an employee's human resource record related to a human resources management system, a validation for a requested reimbursement related to an expense reporting tracking system, among other requests that are associated with one or more record updates to be processed by party 131.

In various embodiments, since party 101 and party 131 can operate as independent self-serving parties, the update record exchange between the two parties can be audited and independently verified by both parties via a blockchain record certification. For example, using blockchain certification module 135 of party 131, the update notification received at party 131 can be verified by party 131 by comparing the received update with a digest of the update stored on blockchain 151. Upon verification, party 131 can sign the blockchain record certification using its own private cryptographic key via key management system 141. Moreover, party 131 can store a local version of the update record in record management system 137. The local record from record management system 137 exists for subsequent verification of the record update, for example, in the event of a dispute between parties 101 and 131. Each party, party 101 and party 131, and its user accounts typically do not have write access to the record management system of the other party, i.e., record management system 107 for party 101 and record management system 137 for party 131. In some embodiments, record management system 137 is implemented as a database, such as a local and/or distributed database. As with blockchain certification module 105, blockchain certification module 135 of party 131 can offer access to its blockchain certification functionality via a variety of application interfaces such as application programming interfaces (APIs) accessible to applications 133 and interfacing with record management system 137 and key management system 141.

In some embodiments, blockchain 151 is a blockchain or similar ledger for storing blockchain record certifications. In some embodiments, the certifications are stored as blockchain transactions. For example, data written to blockchain 151, such as data associated with a blockchain record certification, is both immutable and irrefutable. In various embodiments, the data stored for a blockchain record certification is a hashed version of an application update, such as a cryptographic digest, and does not include directly accessible confidential information. The stored data can include hashed versions of properties of the application update such as the timing associated with the update, the applications involved in the update, parameters of the update, the parties involved in the update, and/or service agreement terms associated with the update request, among other parameters. To verify that all parties agree to the contents and/or accuracy of the update, the blockchain record certification is digitally signed by all involved parties. In some embodiments, a blockchain record certification may correspond to multiple blockchain transactions and/or the data may be spread across one or more transactions and/or stored across different addresses associated with the blockchain. In various embodiments, blockchain 151 can be a public or private blockchain. For example, a private blockchain can include a blockchain where all parties involved in the update, such as party 101 and party 131, operate nodes of the private blockchain.

Although single instances of some components have been shown to simplify the diagram of FIG. 1, additional instances of any of the components shown in FIG. 1 may exist. Moreover, some functionality of the components may be implemented in different and/or across multiple different components. For example, the functionality of blockchain certification modules 105 and 135 may be implemented across two or more components and/or may rely on external services accessible by their respective parties, party 101 and party 131. As another example, record management systems 107 and 137 may be implemented by one or more databases and may include distributed implementations. Similarly, key management systems 111 and 141 may include external components with the proper security measures. For example, key management systems 111 and/or 141 may be implemented via secure external hardware accessible via secure network protocols. In various embodiments, the network environment of FIG. 1 can include two different customer network environments and/or a shared network environment implemented using private servers such as private virtual servers. Portions of the network environment of FIG. 1 can further be implemented in connection with the public Internet, may be implemented in a distributed and/or decentralized manner, and/or may be replicated across multiple hardware and/or software entities. For example, the ledger of blockchain 151 may be implemented via one or more decentralized, distributed, and/or replicated blockchain nodes. In some embodiments, components not shown in FIG. 1 may also exist.

Figure 2:
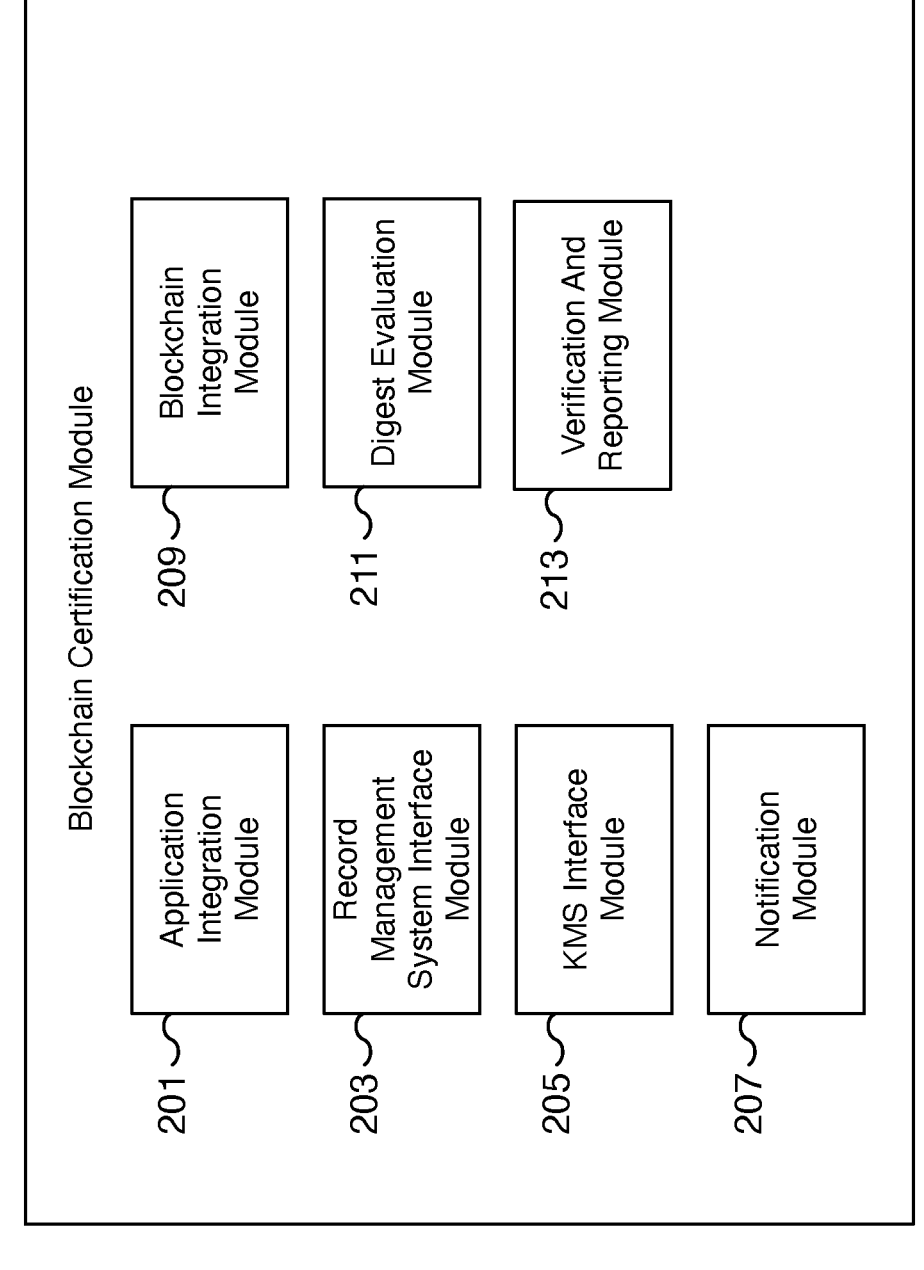
FIG. 2 is a block diagram illustrating an embodiment of a blockchain certification module.

FIG. 2 is a block diagram illustrating an embodiment of a blockchain certification module. In the example shown, blockchain certification module 200 includes application integration module 201, record management system interface module 203, key management system interface module 205, notification module 207, blockchain integration module 209, digest evaluation module 211, and verification and reporting module 213. In various embodiments, the components of blockchain certification module 200 are used to implement a blockchain record certification system for record updates that involve multiple parties. For example, each record update can correspond to an application update, an application request, an application transaction, an application programming interface (API) call, and/or another similar data record update where two or more parties are involved. Using an external blockchain record certification allows all parties involved in the update to verify the accuracy of the update. The functionality of blockchain certification module 200 allows the parties involved in the update to integrate a blockchain record certification with existing applications, record management systems, and key management systems, for example, by exposing the appropriate functionality via interfaces such as APIs and/or interfacing with the appropriate API components, application modules, libraries, and/or other functional components. In some embodiments, blockchain certification module 200 is blockchain certification module 105 and/or blockchain certification module 135 of FIG. 1.

In some embodiments, application integration module 201 includes functionality that allows blockchain certification module 200 to interface with applications. For example, application integration module 201 can expose APIs that allow applications such as application 103 and/or application 133 of FIG. 1 to access blockchain certification module 200. In various embodiments, application integration module 201 includes a blockchain-certified API library. The accessible functionality of application integration module 201 can include an interface to allow an application to store a digest of an update as a blockchain record and notify an external party to process the update. In some embodiments, the accessible functionality can include verifying an update received via an update notification is correctly represented by a referenced blockchain record certification. The accessible functionality can also confirm the validity of digital signatures, such as for digital signatures used to sign a blockchain record certification. In some embodiments, application integration module 201 interfaces with other components of application integration module 201 to implement portions of the exposed functionality, such as for writing and reading from a blockchain, determining record digests, performing and verifying digital signatures, etc.

In some embodiments, record management system interface module 203 includes functionality that allows blockchain certification module 200 to interface with a local record management system. For example, using record management system interface module 203, local records can be written to and/or accessed from a local record management system. In some embodiments, record management system interface module 203 is used by and/or utilizes other components of blockchain certification module 200 such as notification module 207, digest evaluation module 211, and/or verification and reporting module 213, among others, to access local records. For example, verification and reporting module 213 can utilize record management system interface module 203 to retrieve local records when creating a verification report. In some embodiments, the record management system accessible via record management system interface module 203 is a distributed and/or remote record management system.

In some embodiments, key management system interface module 205 includes functionality that allows blockchain certification module 200 to access key management functionality for a configured key management system. For example, using key management system interface module 205, a blockchain record certification can be signed with the appropriate private cryptographic key. In some embodiments, key management system interface module 205 further allows a party to verify the authenticity and accuracy of a digital signature.

In some embodiments, notification module 207 includes functionality that allows blockchain certification module 200 to send and/or receive update notifications and corresponding acknowledgements. For example, using notification module 207, an application update and a reference to the appropriate blockchain record certification can be prepared and provided to the appropriate receiving party. Similarly, an acknowledgement of an application update can be prepared and provided using notification module 207. In various embodiments, notification module 207 can facilitate sending and receiving notifications on behalf of applications and/or application integration module 201.

In some embodiments, blockchain integration module 209 includes functionality that allows blockchain certification module 200 to access a blockchain or similar ledger including the ability to read and write to one or more blockchains. In some embodiments, blockchain integration module 209 includes a blockchain-certified API library and can be utilized to write a digest of an application update as a blockchain record certification to a blockchain. Moreover, blockchain integration module 209 can be utilized to read a blockchain record certification from a blockchain as well as to add a digital signature to a blockchain record certification. In some embodiments, blockchain integration module 209 is used to interface with blockchain transactions via blockchain nodes. The data accessible from the blockchain can be blockchain transactions, proofs, and/or digital certifications, among other data/blockchain formats. In various embodiments, the blockchain is blockchain 151 of FIG. 1.

In some embodiments, digest evaluation module 211 includes functionality that allows blockchain certification module 200 to determine digests for provided data such as an application update. For example, a data payload such as a payload describing an application update is provided and, in return, a digest is evaluated for the provided payload. In some embodiments, the digest is determined by applying a one-way hash function. In various embodiments, digest evaluation module 211 can also be utilized to verify a digest corresponds to a particular payload. For example, a payload and digest are provided and digest evaluation module 211 can determine whether the digest is a proper digest of the provided payload. In some embodiments, digest evaluation module 211 can further provide and/or verify digital signatures. For example, as part of evaluating a digest, digest evaluation module 211 can further provide a digital signature as part of the digest evaluation process. Other functionality involving digests and digital signatures can be supported as well. In some embodiments, digest evaluation module 211 utilizes key management system interface module 205 and/or other services such as an external digest service. For example, digest evaluation module 211 can be configured with a specific digest function and/or with specific digest function parameters.

In some embodiments, verification and reporting module 213 includes functionality that allows blockchain certification module 200 to verify application updates using blockchain record certifications. The verified updates can be compiled into a report, for example, in response to a request for generating an audit report of application updates. In some embodiments, verification and reporting module 213 is used to audit transactions between two parties by using corresponding blockchain record certifications to validate their accuracy. In some embodiments, verification and reporting module 213 is used as part of a process when an application update notification that includes a reference blockchain record certification is received from a sending party. Verification and reporting module 213 can be used to confirm that the referenced blockchain record certification matches the included application update. In some embodiments, verification and reporting module 213 utilizes record management system interface module 203, key management system interface module 205, and/or digest evaluation module 211 to perform verification of application updates. For example, local records can be retrieved and compared to their corresponding digests that are stored and signed as blockchain record certifications.

Figure 3:
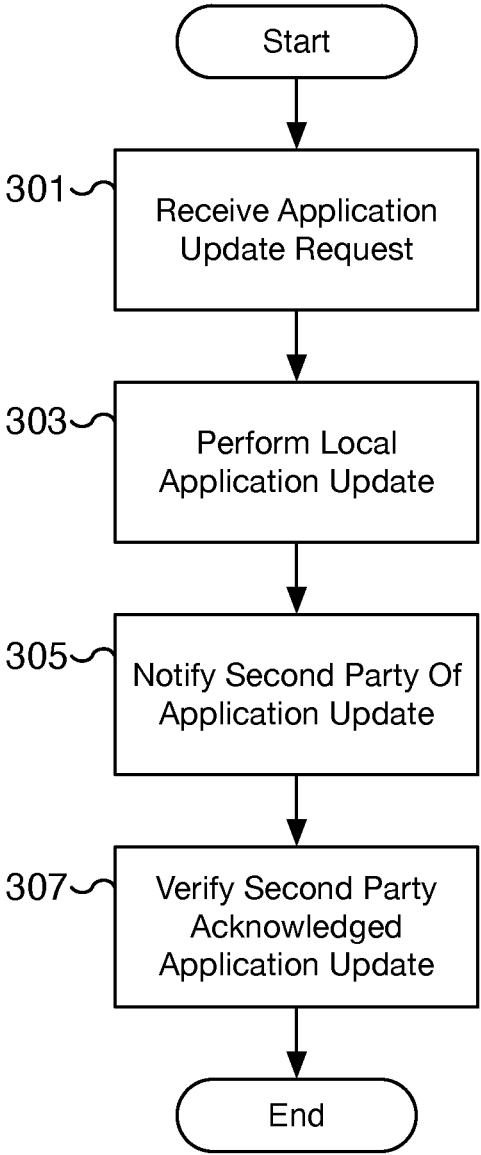
FIG. 3 is a flow chart illustrating an embodiment of a process for performing a blockchain certified application update.

FIG. 3 is a flow chart illustrating an embodiment of a process for performing a blockchain certified application update. For example, using the process of FIG. 3, an application update request initiated at a first party is forwarded to a second party, such as an external service, for processing. The application update can correspond to a record update, an application request, a transaction request, and/or another update that involves updating a record such as a database record. The application update is recorded locally at the first party and publicly using a blockchain record certification. In response to the forwarded update request to the second party, the corresponding external service can verify and acknowledge receipt of the application update by validating the blockchain record certification. In some embodiments, the first party initiating the update request is party 101 of FIG. 1 and the second party receiving the update request for processing is party 131 of FIG. 1. In various embodiments, the blockchain certification utilizes at least in part a blockchain certification module such as blockchain certification module 105 of FIGS. 1 and/or 135 of FIG. 1 and/or blockchain certification module 200 of FIG. 2.

At 301, an application update request is received. For example, an application processes an application request that involves a record update. The record update can correspond to an update to a record such as a database record. In some embodiments, the application update is an update transaction. In various embodiments, different application interactions can trigger an application update such as the submission of an information technology (IT) incident, a reimbursement request for expense reporting, a license request for a third-party service, etc. In various embodiments, application updates correspond to record transactions such as database transactions but can involve external parties such as when an external service is tasked with processing the application update. For example, an IT incident involving a hardware device may be delegated to the hardware manufacturer. As another example, a software license request may be delegated to the software service vendor.

At 303, a local application update is performed. For example, the application update is tracked locally by updating a local record associated with the application update. In some embodiments, the update is a database update and, although local, may involve a remote datastore and/or database service. The update can be considered a local update since the record management system utilized is administrated locally and/or is a trusted system. In contrast, a corresponding record management system maintained by an external service is not necessarily managed within or by the same administrative domain and can function as an independent party with no oversight. In some embodiments, the application update is performed via an application interface to access the appropriate record management system. In some embodiments, the interface utilizes application integration module 201 and/or record management system interface module 203 of FIG. 2.

At 305, a second party is notified of the application update. For example, a second party such as an external service is notified of the application update. The notification can correspond with an assignment of responsibility for performing a task associated with the update. For example, an application update notification associated with an IT incident can correspond to assigning responsibility for resolving the IT incident to the second party. In various embodiments, the provided update includes both the application update and a reference to a blockchain record certification. The referenced blockchain record certification is used to create a layer of trust between the two parties at least in part by providing a means for validating the accuracy of the provided application update.

At 307, an acknowledgement of the application update by the second party is verified. For example, in response to the application update notification provided at 305, the second party can provide an acknowledgement that it received the provided application update. The acknowledgement may include the understanding that the second party has independently verified and/or was provided with the opportunity to independently verify the application update. At 307, the second party's receipt and/or acknowledgement of the application update is verified. In some embodiments, the second party provides its digital signature to the corresponding blockchain record certification as part of its acknowledgement process. For example, the blockchain record certification can be reviewed to verify that the second party has digitally signed the blockchain record certification associated with the application update provided at 305.

Figure 4:
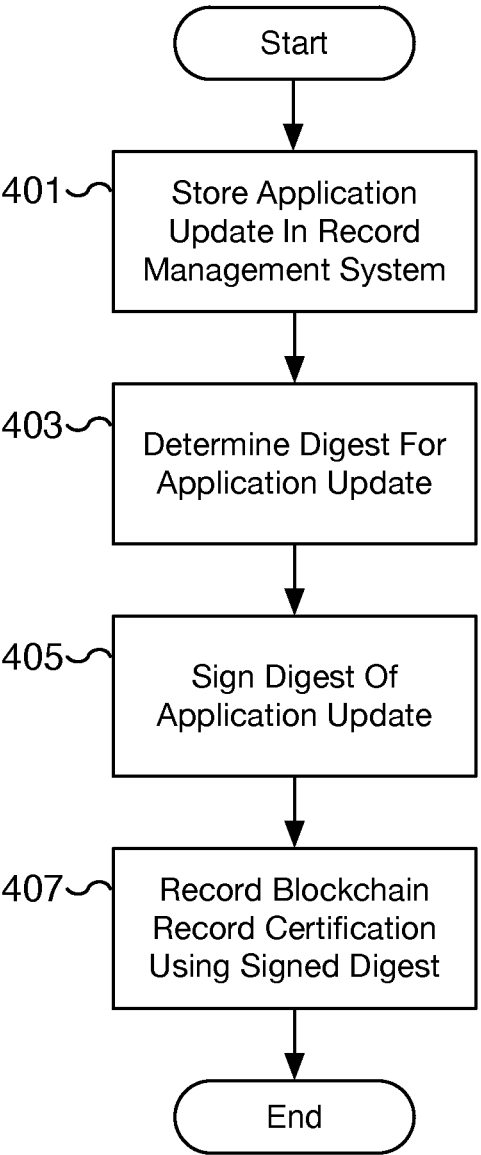
FIG. 4 is a flow chart illustrating an embodiment of a process for performing an application update as part of a blockchain certified application update.

FIG. 4 is a flow chart illustrating an embodiment of a process for performing an application update as part of a blockchain certified application update. For example, using the process of FIG. 4, an application update request is first processed locally by updating an application record in a local record management system and writing a digest of the application update as a blockchain record certification to a blockchain. The process steps of FIG. 4 are performed by a first party prior to initiating additional remote steps involving other parties such as notifying a second party of the application update. In some embodiments, after performing the process of FIG. 4, the second party is notified by the first party to request that additional processing be performed by the second party for the application update. In some embodiments, the process of FIG. 4 is performed at 303 and/or 305 of FIG. 3. In some embodiments, the entity or first party performing the process of FIG. 4 is party 101 of FIG. 1 and the associated second party that will receive a corresponding update request notification is party 131 of FIG. 1. In some embodiments, the local application update process of FIG. 4 utilizes a blockchain certification module, a local record management system, and/or a key management system. In some embodiments, the blockchain certification module is blockchain certification module 105 of FIG. 1 and/or blockchain certification module 200 of FIG. 2. In some embodiments, the local record management system is record management system 107 of FIG. 1 and the key management system is key management system 111 of FIG. 1.

At 401, an application update is stored in a record management system. For example, the application update is stored as a record update in a record management system. The record management system is typically the local record management system of the current entity. For example, the record management system may be a database service of the current entity. In some embodiments, the record management system corresponds to a configuration management database (CMDB). In various embodiments, the local record management system may be hosted on the same server and/or hosted on a remote server but with access granted to the local computing environment and/or a local computing environment account. The application update can be a database update and/or correspond to a record transaction, such as an update corresponding to an information technology (IT) incident, an update to an employee human resources record, an update to a business expense reimbursement request, etc. In various embodiments, many business process workflows implemented by an application involve one or more application updates that require performing the process of FIG. 4.

At 403, a digest for an application update is determined. For example, a one-way hash function is performed on a version of the application update to generate a digest of the application update. In some embodiments, the digest is based on the application update and includes information such as the timing of the update and the parties involved in the update. In some embodiments, the digest can further include service level terms and/or other conditions related to the update and/or update request. In various embodiments, the digest is a version of the application update that can be used to verify the application update when compared to the application update but on its own reveals very little to no information about the contents of the update. In some embodiments, the digest evaluation process is configured to utilize a particular digest algorithm with particular requirements including size requirements, algorithm complexity, collision properties, and/or security requirements. In some embodiments, an agreed upon salt and/or additional information such as party names or identities are utilized in computing the digest.

At 405, the digest of the application update is digitally signed. For example, the digest determined at 405 is digitally signed. In some embodiments, the digital signature is applied by utilizing a key management system that allows the relevant entity or party to access a private cryptographic key. The relevant private cryptographic key can be securely stored and/or accessed via the key management system for use in digital signatures. In various embodiments, by signing the digest of the application update, the party is agreeing to the contents of the application update.

At 407, a blockchain record certification using the signed digest is recorded. For example, a blockchain record certification utilizing the signed digest created at 403 and 405 is written to a blockchain. In various embodiments, the signed digest is recorded as one or more blockchain transactions that are immutable and irrefutable. In some embodiments, the blockchain is a distributed ledger and is publicly accessible. The blockchain may also be implemented as a private blockchain where the relevant parties collaborate to operate blockchain nodes. In some embodiments, a reference to the written blockchain record certification is tracked and will be made available to other parties involved in the corresponding application update. For example, the other parties involved can later retrieve the written blockchain record certification to validate the digest and potentially add their own digital signatures to the blockchain record certification.

Figure 5:
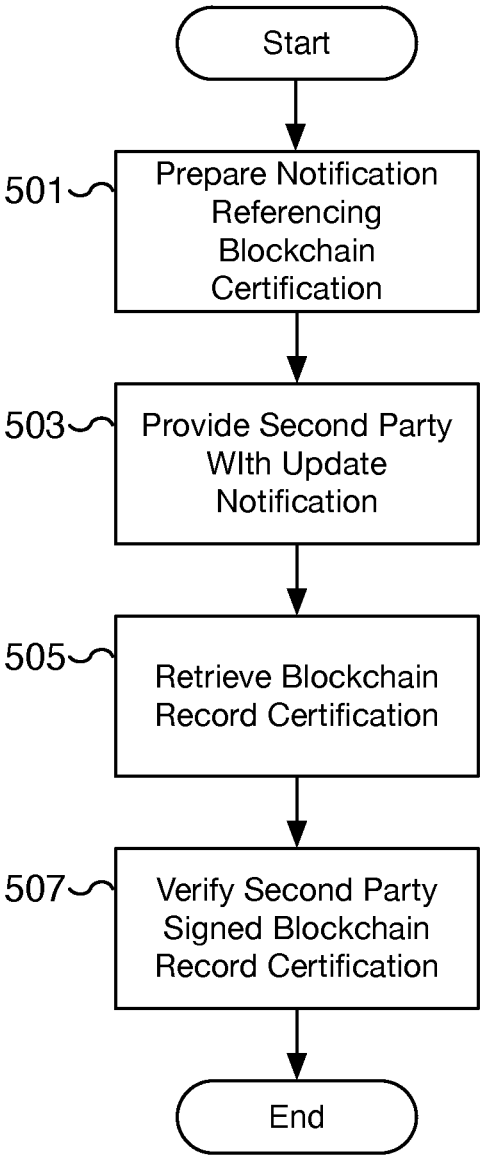
FIG. 5 is a flow chart illustrating an embodiment of a process for providing to an external party a blockchain certified application update.

FIG. 5 is a flow chart illustrating an embodiment of a process for providing to an external party a blockchain certified application update. For example, using the process of FIG. 5, a first party can provide a notification of an application update to a second party, such as a cloud-service provider. As part of the notification, the first party can assign and/or request that the second party process the application update. For example, a first party can utilize a service offered by a second party by providing an application update notification. In order to maintain and/or establish a layer of trust, the two parties utilize a blockchain record certification. The blockchain record certification is utilized as an external source to validate the transmitted application update. By requiring all parties involved in the application update to digitally sign the blockchain record certification, all parties certify that they agree to the corresponding application update. In some embodiments, the blockchain record certification is a digest version of the application update allowing a version of the application update to be publicly accessible without concerns that its contents are accessible. In some embodiments, the process of FIG. 5 is performed at 305 and/or 307 of FIG. 3. In some embodiments, the entity or first party performing the process of FIG. 5 is party 101 of FIG. 1 and the associated second party that will receive the blockchain certified application update is party 131 of FIG. 1. In some embodiments, the process of FIG. 5 utilizes a blockchain certification module, a local record management system, and/or a key management system. In some embodiments, the blockchain certification module is blockchain certification module 105 of FIG. 1 and/or blockchain certification module 200 of FIG. 2. In some embodiments, the local record management system is record management system 107 of FIG. 1 and the key management system is key management system 111 of FIG. 1.

At 501, a notification referencing a blockchain certification is prepared. For example, a notification message including the application update and identifying a corresponding blockchain certification is created. The data payload of the notification can include and/or describe the application update and related requests for the application update. In some embodiments, the notification message includes a reference to a corresponding blockchain record certification, which includes a digest of the application update. The included reference can include a blockchain address to the blockchain record certification that allows the recipient parties of the notification to retrieve the relevant blockchain record certification. In some embodiments, the notification message is a request to access a service offered by an external party and may conform to a web application programming interface (API) provided by a second party.

At 503, a second party is provided with a notification of an application update. For example, the notification created at 501 is provided as a notification message to a second party. In some embodiments, the notification message corresponds to a web API call. For example, the notification functions as a request for the second party to perform the requested application update. In various embodiments, the provided notification can trigger a response from the second party as the second party processes the provided notification. For example, a response message such as an acknowledgement message may be received in response to providing the second party with an application update notification.

At 505, the blockchain record certification is retrieved. For example, once the second party has received and had an opportunity to verify the application update using the blockchain record certification, the blockchain record certification is retrieved from the blockchain. In various embodiments, the retrieved blockchain record certification will reference the second party's verification of the application update. In some embodiments, the second party notifies that it has finished verifying the application update using the blockchain record certification by providing an acknowledgement message.

At 507, the second party's blockchain record certification signature is verified. For example, the blockchain record certification retrieved at 505 is verified by confirming the validity of the second party's digital signature. In various embodiments, the second party will digitally sign the blockchain record certification after confirming the application update corresponds to the blockchain record certification. The digital signature of the second party can be validated using a public cryptographic key of the second party. In some embodiments, the digital signature is an immutable transaction written to the blockchain and may directly and/or indirectly reference the original blockchain record certification as prepared and referenced at 501 and/or 503.

Figure 6:
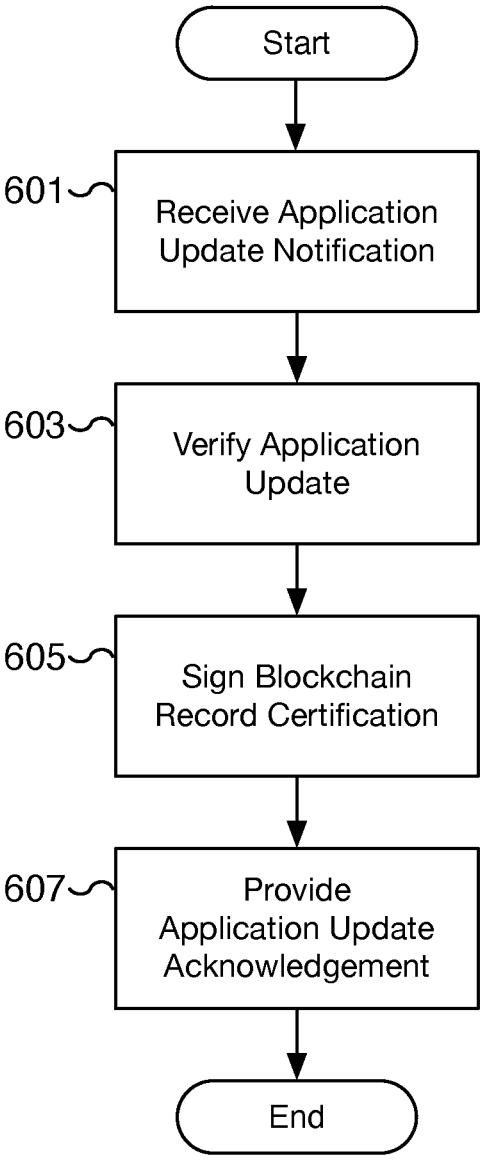
FIG. 6 is a flow chart illustrating an embodiment of a process for processing a received blockchain certified application update.

FIG. 6 is a flow chart illustrating an embodiment of a process for processing a received blockchain certified application update. For example, using the process of FIG. 6, a second party can receive and process a notification of an application update from a first party. The received notification corresponds to an application update with a corresponding blockchain record certification. The receiving second party can validate the received update using the associated blockchain record certification and further digitally sign the blockchain record certification to confirm its receipt and/or accuracy. In some embodiments, the second party further provides an acknowledgment message to the first party confirming the provided application update notification. In various embodiments, the second party hosts one or more services, such as cloud services, for processing the received application update. In some embodiments, the process of FIG. 6 is performed at 305 and/or 307 of FIG. 3 in response to a provided update notification. In some embodiments, the entity or second party performing the process of FIG. 6 is party 131 of FIG. 1 in response to an update notification provided by party 101 of FIG. 1. In some embodiments, the process of FIG. 6 utilizes a blockchain certification module, a local record management system, and/or a key management system. In some embodiments, the blockchain certification module is blockchain certification module 135 of FIG. 1 and/or blockchain certification module 200 of FIG. 2. In some embodiments, the local record management system is record management system 137 of FIG. 1 and the key management system is key management system 141 of FIG. 1.

At 601, an application update notification is received. For example, a notification message requesting an application update is received. In some embodiments, the notification is received at a service offered by the second party, such as via a web application programming interface (API). The notification is a blockchain certified application update which references a blockchain record certification. For example, the payload of the notification can include the contents of the application update including potentially confidential data whereas the corresponding blockchain record certification stored on a blockchain is a digest of the application update with no confidential information.

At 603, the application update is verified. For example, using the corresponding blockchain record certification, the contents of the application update received at 601 is verified. In some embodiments, a digest of the application update is first determined and then the determined digest is compared against the digest of the corresponding blockchain record certification. In the event the two digests match, the second party can be assured of the accuracy of the application update received at 601. In various embodiments, the blockchain record certification is digitally signed by the first party and the digital signature is further verified as part of the verification process. In particular embodiments, the application update notification received at 601 includes a reference to the corresponding blockchain record certification such as a blockchain address used to retrieve the blockchain record certification. In some embodiments, the parties can agree in advance on a location and/or technique for retrieving the corresponding blockchain record certifications for application updates, such as the appropriate blockchain and/or blockchain addresses.

At 605, the blockchain record certification is digitally signed. For example, the blockchain record certification is updated with the signature of the second party. Once the application update has been verified by the receiving party at 603, the receiving party then digitally signs the blockchain record certification. In some embodiments, the digital signature is a new blockchain transaction that is attached, appended, and/or applied as an update to the blockchain record certification. In some embodiments, the digital signature is applied by utilizing a key management system that allows the receiving party to securely access a private cryptographic key for the digital signature.

At 607, an application update acknowledgement is provided. For example, a message response to the notification message received at 601 is provided to the sending (or first) party. In some embodiments, the response is an acknowledgement message that confirms receipt of the application update notification. The acknowledgement may further confirm that the received application update was verified and/or that the receiving party has signed (or counter-signed) its digital signature to the blockchain record certification. In some embodiments, the acknowledgement message may include a result response to the application update, such as a resolution response or similar message. In some embodiments, the acknowledgement is an asynchronous message. The provided application update acknowledgement may be utilized by the first party to, at least in part, verify the digital signature applied at 605.

Figure 7:
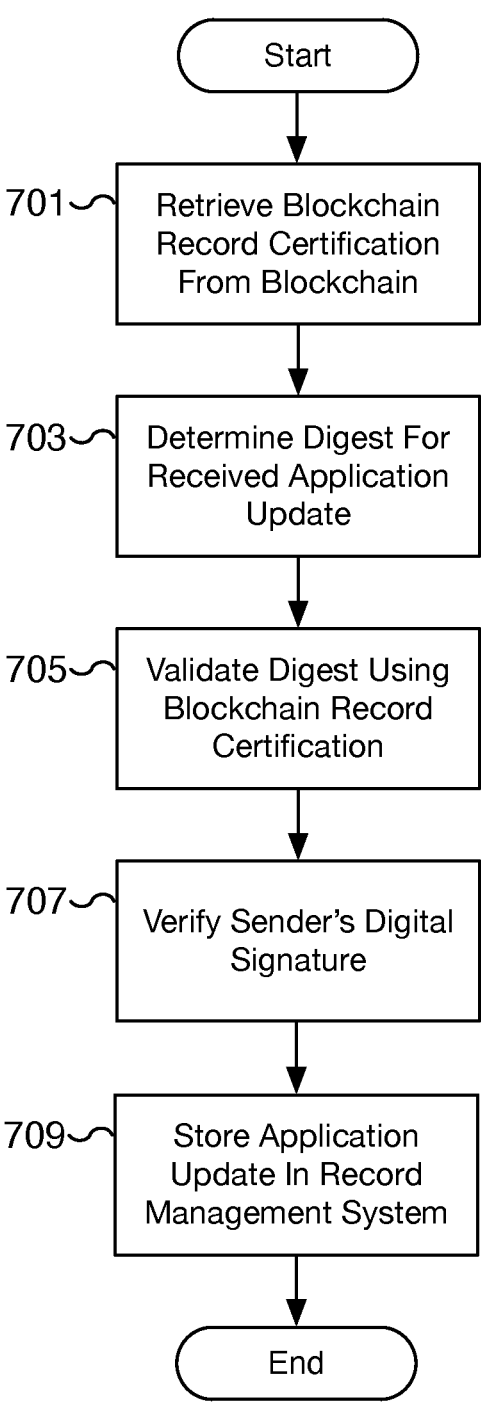
FIG. 7 is a flow chart illustrating an embodiment of a process for processing and verifying a received blockchain certified application update.

FIG. 7 is a flow chart illustrating an embodiment of a process for processing and verifying a received blockchain certified application update. For example, using the process of FIG. 7, a second party can confirm and acknowledge the accuracy of a received application update provided by a first party. The received application update can be provided via a notification and is associated with a blockchain record certification. In various embodiments, by verifying the blockchain certified application update, the receiving party is acknowledging the accuracy of the received application update. In some embodiments, the process of FIG. 7 is performed at 305 and/or 307 of FIG. 3 and/or at 603 of FIG. 6 in response to a provided update notification. In some embodiments, the entity or second party performing the process of FIG. 7 is party 131 of FIG. 1 in response to an update notification provided by party 101 of FIG. 1. In some embodiments, the process of FIG. 7 utilizes a blockchain certification module, a local record management system, and/or a key management system. In some embodiments, the blockchain certification module is blockchain certification module 135 of FIG. 1 and/or blockchain certification module 200 of FIG. 2. In some embodiments, the local record management system is record management system 137 of FIG. 1 and the key management system is key management system 141 of FIG. 1.

At 701, a blockchain record certification is retrieved from the blockchain. For example, a blockchain record certification is read from the blockchain in preparation for it to be analyzed. In various embodiments, the blockchain data records of the blockchain record certification are accessible via one or more distributed blockchain nodes.

At 703, a digest is determined for the received application update. For example, a configured one-way hash function is performed on the application update and/or portions of the application update payload that was received as part of an application update notification. The hash function is utilized to generate a digest of the application update for comparison to a digest stored in the corresponding blockchain record certification. In some embodiments, the parties can agree on additional information to include in determining the digest, such as a salt and/or other information, to add additional complexity and/or security for determining the digest.

At 705, the digest is validated using the blockchain record certification. For example, the digest computed locally at 703 is compared to the digest from the blockchain record certification retrieved at 701. In the event the two digests match, the receiving party can be assured of the accuracy of the application update it has received.

At 707, the sender's digital signature is verified. For example, the digital signature of the sender associated with the blockchain record certification is verified. In various embodiments, the digital signature is used to confirm that the first party is the entity that created and stored the corresponding blockchain record certification on the blockchain.

At 709, the application update is stored in a record management system. For example, once the application update is validated at 705 and the sender's digital signature is verified at 707, the application update can be recorded, such as in a local (or locally accessible) record management system. In some embodiments, the application update is stored by updating a record in a record management system, such as a database service, accessible primarily by the second party. Management of the record management system is independent of the blockchain and/or the sending (or first) party's own record management system. In various embodiments, the stored application update can be used to later audit application updates along with their corresponding blockchain record certifications.

Figure 8:
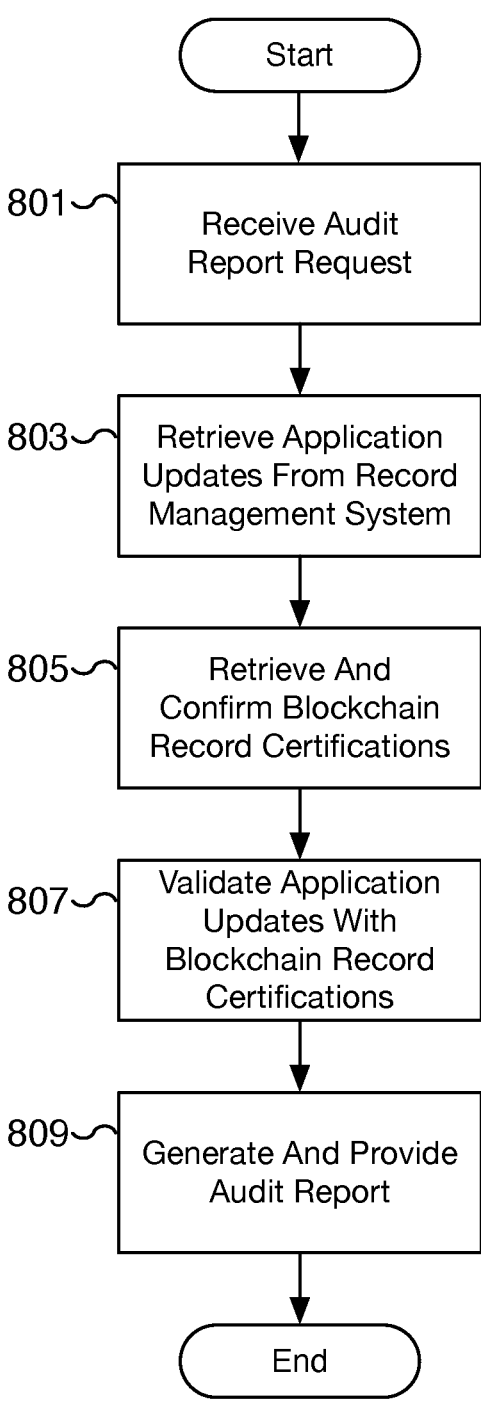
FIG. 8 is a flow chart illustrating an embodiment of a process for auditing blockchain certified application updates.

FIG. 8 is a flow chart illustrating an embodiment of a process for auditing blockchain certified application updates. For example, using the process of FIG. 8, application updates with corresponding blockchain record certifications can be audited for accuracy. In some embodiments, a report of the auditing processing is generated and the results can be used to confirm whether one or more service level agreements have been met. In some embodiments, the process of FIG. 8 can be performed by any party participating in the application update and allows all participating parties to confirm results determined by other parties. In some embodiments, the process of FIG. 8 is performed by party 101 and/or party 131 of FIG. 1. In some embodiments, the process of FIG. 8 utilizes a blockchain certification module, a local record management system, and/or a key management system. In some embodiments, the blockchain certification module is blockchain certification module 105 of FIGS. 1 and/or 135 of FIG. 1, and/or blockchain certification module 200 of FIG. 2. In some embodiments, the local record management system is record management system 107 of FIGS. 1 and/or 137 of FIG. 1 and the key management system is key management system 111 of FIGS. 1 and/or 141 of FIG. 1.

At 801, a request is received for an audit report. For example, a party to a blockchain certified application update receives a request to generate a report auditing the application updates between two or more parties. The report generated can be used to confirm that the parties all previously agreed to the transmitted application updates. Moreover, the report can be generated and/or verified by any of the parties involved by using blockchain record certifications accessible by all parties involved. In particular embodiments, the report specifies parameters of the audit such as a time frame, the parties involved, service level terms, sampling parameters, etc.

At 803, application updates are retrieved from a record management system. For example, the application updates corresponding to the requested report are retrieved. In various embodiments, the records can correspond to database records and can be retrieved from a local record management system. The record management system may be accessible locally but may utilize a distributed and/or remote database service and/or data store. In some embodiments, the application updates and their associated records are retrieved based on a time frame specified by the request received at 801. For example, the report received can specify a timeframe such as the last week, the last month, a particular time span, etc. Using the specified time frame, only the relevant application updates are retrieved. In some embodiments, the addresses for corresponding blockchain record certifications are stored in a record management system along with the associated application update.

At 805, blockchain record certifications are retrieved and confirmed. For example, the blockchain record certifications associated with the application updates retrieved at 803 are retrieved from the corresponding blockchain. In some embodiments, the blockchain record certifications retrieved are based on a time frame specified by the request received at 801. Using the specified time frame, only the relevant blockchain record certifications are retrieved. In some embodiments, each party can store an index of relevant blockchain record certifications based on time (or other properties) and/or the index can be stored on the blockchain. In some embodiments, the addresses for blockchain record certifications are stored in a record management system and are resolved as part of retrieving the application updates at 803.

At 807, the application updates are validated with blockchain record certifications. Using the blockchain record certifications retrieved at 805, the corresponding application updates are validated. In some embodiments, the digital signatures of the blockchain record certifications are first verified as valid and accurate and then their associated digests are compared to the digests determined for the application updates. In order for an application update to be considered agreed upon by all parties, the corresponding digests must match and the signatures must be valid.

At 809, an audit report is generated and provided. For example, a report of the validated application updates is generated and provided. In various embodiments, the generated report can include individual application update validation results and/or aggregated results based on a set of validated application updates. For example, two parties may send hundreds, thousands, or more application updates and the audit report generated may be most useful by including aggregated results. In particular embodiments, the aggregated results may be used to determine whether terms of a service level agreement have been met. In various embodiments, the audit report can be digitally signed by the party generating the report. In some embodiments, the audit report can be further signed by a party confirming the accuracy of the report, such as by validating application updates stored in its own record management system with corresponding blockchain record certifications.

Figure 9:
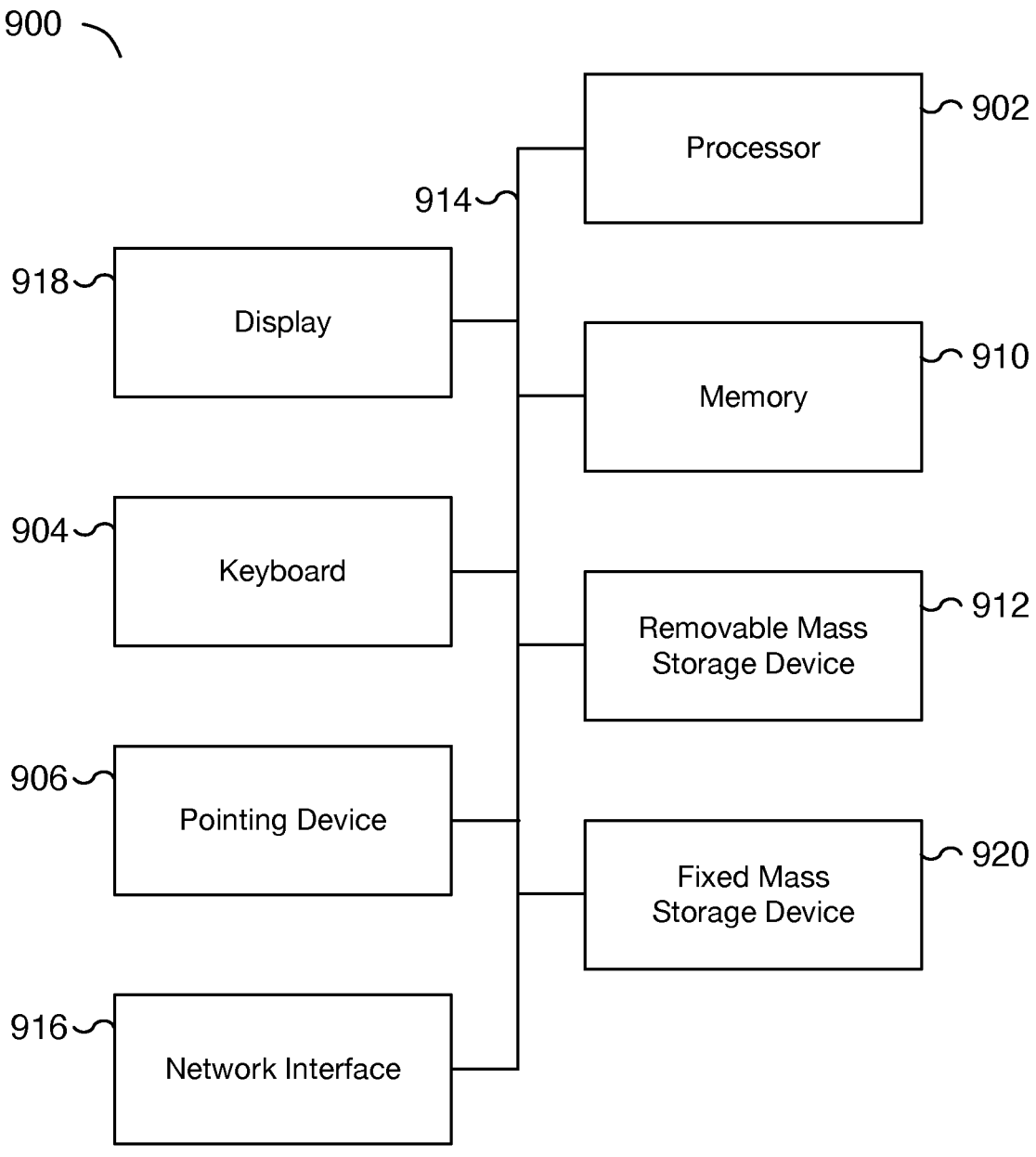
FIG. 9 is a functional diagram illustrating a programmed computer system for implementing blockchain certified application updates.

FIG. 9 is a functional diagram illustrating a programmed computer system for implementing blockchain certified application updates. As will be apparent, other computer system architectures and configurations can be utilized for performing and verifying blockchain certified application updates including those with one or more graphical processing units (GPUs). Examples of computer system 900 include party 101 and party 131 of FIG. 1 and one or more computers used to implement blockchain 151 of FIG. 1. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In various embodiments, one or more instances of computer system 900 can be used to implement at least portions of the processes of FIGS. 3-8.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or unidirectional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or unidirectionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving, by a first computing system, a request to update a record of an incident report relating to operation of a device or network;

in response to the request, causing the record to be updated in a storage of the first computing system;

generating, by the first computing system, a digest of the request, wherein the digest does not contain confidential information relating to the incident report;

signing, by the first computing system, the digest;

causing, by the first computing system, the signed digest to be recorded on a blockchain as a certification of the update;

transmitting, by the first computing system, a notification associated with the incident report to a second computing system, wherein the notification refers to an address on the blockchain of the certification of the update recorded on the blockchain, wherein the notification indicates to the second computing system that the first computing system has delegated resolving of at least a portion of the incident report to the second computing system, wherein the notification causes the second computing system to sign the certification of the update recorded on the blockchain, and wherein the notification includes the confidential information relating to the incident report; and receiving, by the first computing system, an acknowledgment that the second computing system has signed the certification of the update recorded on the blockchain.

2. The method of claim 1, wherein a user account granted write access to the first computing system does not have write access to the second computing system.

3. The method of claim 1, wherein the notification includes a data payload identifying the request.

4. The method of claim 1, wherein the first computing system is hosted on a first server and the second computing system is hosted on a second server, and wherein the first server and the second server are different.

5. The method of claim 4, wherein the first server is a first virtual private server and the second server is a second virtual private server.

6. The method of claim 1, wherein the acknowledgement is associated with a verification performed by the second computing system on the notification.

7. The method of claim 6, wherein the verification performed by the second computing system includes:

generating a second digest of the request;

retrieving the signed digest from the blockchain; and comparing the second digest to a version of the signed digest.

8. The method of claim 6, wherein the verification performed by the second computing system further includes verifying a digital signature of the signed digest.

9. The method of claim 1, further comprising:

retrieving a digital signature from the blockchain associated with the signed digest; and verifying the digital signature is associated with the second computing system.

10. A system comprising:

one or more processors; and a memory coupled to the one or more processors, wherein the memory is configured to provide the one or more processors with instructions which when executed cause the one or more processors to:

receive, by a first computing system, a request to update a record of an incident report relating to operation of a device or network;

in response to the request, cause the record to be updated in a storage of the first computing system;

generate, by the first computing system, a digest of the request, wherein the digest does not contain confidential information relating to the incident report;

sign, by the first computing system, the digest;

cause, by the first computing system, the signed digest to be recorded on a blockchain as a certification of the update;

transmit, by the first computing system, a notification associated with the incident report to a second computing system, wherein the notification refers to an address on the blockchain of the certification of the update recorded on the blockchain, wherein the notification indicates to the second computing system that the first computing system has delegated resolving of at least a portion of the incident report to the second computing system, wherein the notification causes the second computing system to sign the certification of the update recorded on the blockchain, and wherein the notification includes the confidential information relating to the incident report; and receive, by the first computing system, an acknowledgment that the second computing system has signed the certification of the update recorded on the blockchain.

11. The system of claim 10, wherein a user account granted write access to the first computing system does not have write access to the second computing system.

12. The system of claim 10, wherein the notification includes a data payload identifying the request.

13. The system of claim 10, wherein the first computing system is hosted on a first server and the second computing system is hosted on a second server, and wherein the first server and the second server are different.

14. The system of claim 13, wherein the first server is a first virtual private server and the second server is a second virtual private server.

15. The system of claim 10, wherein the acknowledgement is associated with a verification performed by the second computing system on the notification.

16. The system of claim 15, wherein the verification performed by the second computing system includes:

generating a second digest of the request;

retrieving the signed digest from the blockchain; and comparing the second digest to a version of the signed digest.

17. The system of claim 10, wherein the memory is further configured to provide the one or more processors with instructions which when executed cause the one or more processors to:

retrieve a digital signature from the blockchain associated with the signed digest; and verify the digital signature is associated with the second computing system.

18. A computer program product, the computer program product being embodied in a non-transitory computer readable storage medium and comprising computer instructions for:

receiving, by a first computing system, a request to update a record of an incident report relating to operation of a device or network;

in response to the request, causing the record to be updated in a storage of the first computing system;

generating, by the first computing system, a digest of the request, wherein the digest does not contain confidential information relating to the incident report;

signing, by the first computing system, the digest;

causing, by the first computing system, the signed digest to be recorded on a blockchain as a certification of the update;

transmitting, by the first computing system, a notification associated with the incident report to a second computing system, wherein the notification refers to an address on the blockchain of the certification of the update recorded on the blockchain, wherein the notification indicates to the second computing system that the first computing system has delegated resolving of at least a portion of the incident report to the second computing system, wherein the notification causes the second computing system to sign the certification of the update recorded on the blockchain, and wherein the notification includes the confidential information relating to the incident report; and receiving, by the first computing system, an acknowledgment that the second computing system has signed the certification of the update recorded on the blockchain.

19. The method of claim 1, wherein the acknowledgement includes a response relating to the update of the record.

* * * * *